United States Patent [19]
Wu et al.

[11] Patent Number: 6,063,722
[45] Date of Patent: May 16, 2000

[54] PROCESS FOR MAKING A COMPOSITION THAT IS USEFUL FOR CONVERTING LOWER VALUE AROMATICS TO HIGHER VALUE AROMATICS

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/168,213

[22] Filed: Oct. 7, 1998

[51] Int. Cl.[7] .............................. B01J 29/04; B01J 29/06; B01J 21/00; B01J 29/08; B01J 29/18
[52] U.S. Cl. .................................. 502/60; 502/64; 502/66; 502/74; 502/77; 502/78; 502/79; 502/80
[58] Field of Search ................... 502/60, 64, 66, 502/74, 77, 78, 79, 80

[56] References Cited

U.S. PATENT DOCUMENTS

| | | | |
|---|---|---|---|
| 4,252,688 | 2/1981 | Gallei et al. | 252/455 Z |
| 4,465,886 | 8/1984 | Rodewald | 585/467 |
| 4,914,068 | 4/1990 | Cross et al. | 502/74 |
| 4,950,835 | 8/1990 | Wang et al. | 585/467 |
| 5,112,472 | 5/1992 | Gosselink et al. | 208/59 |
| 5,365,003 | 11/1994 | Chang et al. | 585/470 |
| 5,476,823 | 12/1995 | Beck et al. | 502/60 |
| 5,516,736 | 5/1996 | Chang et al. | 502/64 |
| 5,552,035 | 9/1996 | Potter et al. | 208/135 |
| 5,552,357 | 9/1996 | Lago et al. | 502/63 |
| 5,554,274 | 9/1996 | Degnan et al. | 208/111 |
| 5,574,199 | 11/1996 | Beck et al. | 585/407 |
| 5,602,066 | 2/1997 | Beck et al. | 502/64 |
| 5,610,112 | 3/1997 | Lago et al. | 502/63 |
| 5,612,270 | 3/1997 | Beck et al. | 502/64 |
| 5,625,103 | 4/1997 | Abichandani et al. | 585/475 |
| 5,675,047 | 10/1997 | Beck et al. | 585/467 |
| 5,726,114 | 3/1998 | Chang et al. | 502/64 |

*Primary Examiner*—Steven P. Griffin
*Assistant Examiner*—Cam N. Nguyen
*Attorney, Agent, or Firm*—Richmond, Hitchcock, Fish & Dollar

[57] ABSTRACT

A process to produce a composition is provided. Said process comprises: contacting a zeolite component and selectivation component to form a first mixture; followed by treating said first mixture to form a second mixture; followed by contacting said second mixture with a binder component to form a third mixture; followed by agglomerating said third mixture to form a fourth mixture; followed by treating said fourth mixture to form a fifth mixture; followed by contacting said fifth mixture with a Group 8, 9, or 10 metal component to form a sixth mixture; and followed by treating said sixth mixture to from said composition.

16 Claims, No Drawings

PROCESS FOR MAKING A COMPOSITION THAT IS USEFUL FOR CONVERTING LOWER VALUE AROMATICS TO HIGHER VALUE AROMATICS

FIELD OF THE INVENTION

This invention is related to the field of processes used to produce compositions, where said compositions can be used to convert low value aromatic compounds into higher value aromatic compounds, such as, for example, converting toluene into xylene.

BACKGROUND OF THE INVENTION

The production of aromatic compounds is a multimillion dollar business. Millions of dollars have been spent on research to improve these production processes. This is because of the large scale economics that are involved. That is, even small improvements in these processes can add millions of dollars to the bottom line. Consequently, research is on-going to find new and useful ways to produce these higher value aromatic compounds.

SUMMARY OF THE INVENTION

It is an object of this invention to provide a process to produce a composition.

It is another object of this invention to provide said composition.

It is another object of this invention to provide a process to use said composition.

In accordance with this invention a process to produce a composition is provided. Said process comprises (optionally, consists essentially of, or consists of):

(1) contacting
  (1.1) a zeolite component, and
  (1.2) selectivation component, to form a first mixture;
(2) treating said first mixture to form a second mixture;
(3) contacting said second mixture with a binder component to form a third mixture;
(4) agglomerating said third mixture to form a fourth mixture;
(5) treating said fourth mixture to form a fifth mixture;
(6) contacting said fifth with a Group 8, 9, or 10 metal component to form a sixth mixture; and
(7) treating said sixth mixture to from said composition.

In accordance with this invention said composition produced by this process is provided.

In accordance with this invention a process of using said composition to convert alkylaromatic compounds to multi-alkylaromatic compounds is provided.

These and other objects will become more apparent with the following.

The terms "comprise", "comprises" and "comprising" are open-ended and do not exclude the presence of other steps, elements, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as along as such steps, elements, or materials, do not affect the basic and novel characteristics of the invention, additionally, they do not exclude impurities normally associated with the elements and materials used.

The above terms and phrases are intended for use in areas outside of U.S. jurisdiction. Within the U.S. jurisdiction the above terms and phrases are to be applied as they are construed by U.S. courts and the U.S. Patent Office.

DETAILED DESCRIPTION OF THE INVENTION

The zeolite component comprises a zeolite that has been treated with an acid to form an acid treated zeolite (sometimes called HZSM). Methods of making such acid treated zeolites are known in the art. The zeolite component preferably has a constraint index from about 0.1 to about 12. However, it is preferred when the constraint index is from about 2 to about 9. The constraint index can be determined in accordance with procedures known in the art, preferably, in accordance with U.S. Pat. No. 4,097,367. Examples of zeolites include, but are limited to, ZSM-5; ZSM-8, ZSM-11, ZSM-12, ZSM35, and ZSM-38. Mixtures of these zeolites can be used. Currently, it is preferred to use ZSM-5 in the form of HZSM-5.

The selectivation component comprises any compound that contains silicon, where said compound contains silicon-oxygen bonds or where said compound is convertible to a compound that contains silicon-oxygen bonds under the treating conditions of step (2), and where said selectivation component benefits the reaction desired of the composition. Inorganic and organic silicon compounds can be used. However, organic silicon compounds are preferred. Examples of such selectivation components are poly (phenylmethyl)siloxane, tetraethoxysilicon, and tetraethylorthosilicate. Mixtures of selectivation components can be used. Currently, poly(phenylmethyl)siloxane is preferred. A preferred selectivation component is available from the Dow Chemical Company as Dow-510.

The binder component comprises a compound that is an oxide, or a compound that is convertible to a oxide during treating step (5), where said oxide contains a Group 2, 13–15 element (See Hawley's Condensed Chemical Dictionary, 11th Edition, 1987). Examples of such binder components are chlorhydrol, alumina, silica, aluminum phosphate, and clays. Mixtures of these binder components can be used. Currently it is preferred to use Ludox AS-40 which is silica in cyclohexane and which is available from Dow Chemical Company. Examples of the elements that can be used in this invention are beryllium, magnesium, calcium, boron, aluminum, silicon, and phosphorus.

The Group 8, 9, or 10 metal component comprises any compound that contains a Group 8, 9, or 10 metal, where said compound contains Group 8, 9, or 10 metal-oxygen bonds or where said compound is convertible to a compound that contains Group 8, 9, or 10 metal-oxygen bonds under the treating conditions of Step (5). The Group 8, 9, or 10 metals are, for the purposes of this invention, iron, cobalt, nickel, ruthenium, rhodium, palladium, osmium, iridium, and platinum. However, currently platinum is preferred. Inorganic and organic compounds can be used. A preferred example of such Group 8, 9, or 10 metal component is chloroplatinic acid. Other examples can be found in the Strem Catalog No. 17 (1997–1999) by Strem Chemicals, Inc. Mixtures of Group 8, 9, or 10 metal components and metals can be used.

The zeolite component and the selectivation component can be contacted in any manner known in the art that will form a mixture. One method is simply mixing all of the components together in a container. Another method is mixing the components in a sequential manner. This forms the first mixture.

The amount of selectivation component to use to form the first mixture is from about 1 to about 1000 weight percent, preferably from about 5 to about 50 weight percent, and most preferably from about 10 to about 30 weight percent, where said weight percent is based on the weight of the zeolite component.

The first mixture is then treated to form a second mixture. Sometimes the first mixture is allowed to air dry at room temperature and pressure for about 1 to 100 hours, before treating it, however, this is not required. The function of said treating step is to remove substantially all of the water in said first mixture, and to convert any components, which are not oxides, into oxides. If any component needs to be converted to an oxide, substantially all of said component needs to be converted. This treatment is usually conducted in the presence of oxygen.

The temperature for such treating can be from about 100° C. to about 1000° C., preferably from about 150° C. to about 900° C., and most preferably from 200° C. to 800° C. The pressure of such treating can be from below atmospheric to superatmospheric, however, atmospheric is preferred. The time period for treating is from about 0.1 to about 100 hours.

The second mixture is then contacted with a binder component to form a third mixture.

The amount of binder component to use to form the third mixture is from about 1 to about 10000 weight percent, preferably from about 10 to about 500 weight percent, and most preferably from about 50 to 150 weight percent, where said weight percent is based on the weight of the zeolite component.

The third mixture is then agglomerated to form a fourth mixture. Various methods are known to agglomerate mixtures, such as, for example, extrusion, spray-drying, and pelletizing.

The fourth mixture is then treated to form a fifth mixture. The function of said treating step is to remove substantially all of the water in said fourth mixture, and to convert any components, which are not oxides, into oxides. If any component needs to be converted to an oxide, substantially all of said component needs to be converted.

The temperature for such treating can be from about 100° C. to about 1000° C., preferably from about 150° C. to about 900° C., and most preferably from 200° C. to 800° C. The pressure of such treating can be from below atmospheric to superatmospheric, however, atmospheric is preferred. The time period for treating is from about 0.1 to about 100 hours.

The fifth mixture is then contacted with a Group 8, 9, and 10 metal component to form a sixth mixture. The amount of Group 8, 9, and 10 metal component to use to form the fifth mixture is from about 1 to about 1000 weight percent, preferably from about 2 to about 75 weight percent, and most preferably from about 5 to 50 weight percent, where said weight percent is based on the weight of the zeolite component. However, in any case, it is most preferred that the amount of the Group 8, 9, and 10 metal in the composition is from about 0.1 to about 10 weight percent, preferably from about 0.2 to about 5 weight percent, and most preferably from about 0.5 to 2 weight percent, where said weight percent is based on the weight of the composition.

After the sixth mixture is produced it is subjected to a treating step to form the composition. The function of said treating step is to remove substantially all of the water in said fifth mixture and to convert any other components, which are not oxides, into an oxide. If any component needs to be converted to an oxide, substantially all of said component needs to be converted.

The term "substantially all" means, in this application, that any residual water and unconverted components do not affect the use of the composition in the desired process. Preferably, less than 10 weight percent water is left in the composition, and preferably, less than 10 weight percent unconverted components are left in the composition.

This composition can be used in a process to convert alkylaromatic compounds into multialkylaromatic compounds. An example of such a process is using said composition to convert toluene into xylene. Process conditions are known in the art, and can be readily used with this composition.

All treating steps are preferably conducted in the presence of an oxygen containing ambient.

In the following examples all parts are parts by weight.

EXAMPLES

Example One (Inventive)

About 98.02 parts of a zeolite component (HZSM-5 obtained from UOP) was mixed with twenty parts of a 10 weight percent solution of poly (phenylmethyl) silane (Dow 510 obtained from Dow Chemical Company) in cyclohexane, to form a first mixture. The first mixture was allowed to air dry at room temperature and pressure for about 3 hours. It was then treated by subjecting it to a temperature of about 538° C. for about 6 hours at about atmospheric pressure to form a second mixture. This second mixture was then mixed with twenty parts Ludex AS-40 to form a third mixture. This third mixture was then extruded to form a fourth mixture ($\frac{1}{16}$ inch extrudates). This fourth mixture was then treated by subjecting it to a temperature of about 538° C. for about 6 hours at about atmospheric pressure to form a fifth mixture. Ten parts of this fifth mixture was then contacted with 4.84 parts of a solution that contained 1 weight percent chloroplatinic acid and 1 weight percent hydrochloric acid in water to form a sixth mixture. This sixth mixture was then treated by subjecting it to a temperature of about 538° C. for about 6 hours at about atmospheric pressure to form said composition This composition was then tested in a process to convert toluene into p-xylene. This composition contained 0.188 weight percent platinum based on the weight of the composition. See Table A.

Example Two (Comparative)

About 9.5 parts of a zeolite component (HZSM-5 obtained from UOP) was mixed with ten parts of a 10 weight percent solution of poly (phenylmethyl) silane (Dow 510 obtained from Dow Chemical Company) in cyclohexane, to form a first mixture. The first mixture was allowed to air dry at room temperature and pressure for about three hours to form a second mixture. This second mixture was mixed with ten parts Ludex AS-40 to form a third mixture. This third mixture was then extruded to form a fourth mixture ($\frac{1}{16}$ inch extrudates). This fourth mixture was then treated by subjecting it to a temperature of about 538° C. for about 6 hours at about atmospheric pressure to form a fifth mixture. This fifth mixture was then contacted with 6.23 parts of solution that contained 1 weight percent chloroplatinic acid and 1 weight percent hydrochloric acid in water to form a sixth mixture. This sixth mixture was then treated by subjecting it to a temperature of about 538° C. for about 6 hours at about atmospheric pressure to form said composition This composition was then tested in a process to convert toluene into p-xylene. This composition contained 0.179 weight percent platinum based on the weight of the composition. See Table A.

TABLE A

| Example Number | Time (hours) | Temperature (° F.) | Toluene[1] | p-Xylene[2] |
|---|---|---|---|---|
| 1 | 19.0 | 784 | 33.155 | 49.612 |
| 2 | 7.5 | 800 | 35.169 | 24.547 |

[1]This is the weight percent of toluene converted into products based on the total weight of toluene in the process.
[2]This is the weight percent of p-xylene produced based on the weight of toluene converted.

That which is claimed is:

1. A process to produce a composition said process consisting essentially of
    (1) contacting
        (1.1) a zeolite, and
        (1.2) selectivation component, where said selectivation component comprises an organo-silicon compound, to form a first mixture;
    (2) heating said first mixture to form a second mixture, where said heating is conducted at a temperature sufficient to convert any compounds, that are not oxides, into oxides up to about 1000° C.;
    (3) contacting said second mixture with a binder component that is an oxide, or a compound that is convertible to an oxide during treating step (5), where said oxide contains a Group 2, 13–15 element to form a third mixture;
    (4) agglomerating said third mixture to form a fourth mixture;
    (5) heating said fourth mixture to form a fifth mixture, where said heating is conducted at a temperature sufficient to remove substantially all of the water in said fourth mixture, and to convert components that are not oxides into oxides up to about 1000° C.;
    (6) contacting said fifth mixture with a Group 8, 9, or 10 metal compound to form a sixth mixture; and
    (7) heating said sixth mixture to form said composition, where said heating is conducted at a temperature sufficient to remove substantially all of the water in said sixth mixture, and to convert components that are not oxides into oxides up to about 1000° C.

2. A process according to claim 1 wherein said zeolite component comprises a zeolite with a constraint index from about 2 to about 9.

3. A process according to claim 1 wherein said selectivation component is selected from the group consisting of polyphenylmethysiloxane, tetraethoxysilicon, tetraethylorthosilicate, and mixtures thereof.

4. A process according to claim 2 wherein said binder component is a compound of beryllium, magnesium, calcium, boron, aluminum, silicon, phosphorus and mixtures thereof.

5. A process according to claim 4 wherein said Group 8, 9, or 10 metal compound is a compound of cobalt, nickel, palladium, platinum, and mixtures thereof.

6. A process according to claim 5 wherein the amount of selectivation component to use to form the first mixture is from about 5 to about 50 weight percent, where said weight percent is based on the weight of the zeolite.

7. A process according to claim 6 wherein said treating in Step (2) is conducted at a temperature from about 150° C. to about 900° C.

8. A process according to claim 7 wherein the amount of binder component to use to form the third mixture is from about 10 to about 500 weight percent where said weight percent is based on the weight of the zeolite.

9. A process according to claim 8 wherein said treating in Step (5) is conducted at a temperature from about 150° C. to about 900° C.

10. A process according to claim 9 wherein the amount of Group 8, 9, and 10 metal in the composition is from about 0.2 to about 5 weight percent, where said weight percent is based on the weight of the composition.

11. A process according to claim 10 wherein said treating in Step (2) is conducted at a temperature from about 200° C. to 800° C.

12. A process according to claim 11 wherein the amount of binder component to use to form the third mixture is from about 10 to about 30 weight percent, where said weight percent is based on the weight of the zeolite.

13. A process according to claim 12 wherein said selectivation component is selected from the group consisting of poly(phenylmethyl)siloxane, tetraethoxysilicon, tetraethylorthosilicate, and mixtures thereof.

14. A process according to claim 13 wherein the amount of binder component to use to form the third mixture is from about 50 to 150 weight percent, where said weight percent is based on the weight of the zeolite.

15. A process according to claim 14 wherein said treating in Step (5) is conducted at a temperature from 200° C. to 800° C.

16. A process according to claim 15 wherein the amount of Group 8, 9, or 10 metal in the composition is from 0.5 to 2 weight percent, where said weight percent is based on the weight of the composition.

* * * * *